United States Patent [19]

Browne

[11] 4,048,700
[45] Sept. 20, 1977

[54] CLAMP MEANS AND SUPPORT FOR SKIS, IN COMBINATION

[76] Inventor: Joseph N. Browne, c/o Esso Europe Inc., 5 Hanover Sq., London WIROHQ, England

[21] Appl. No.: 731,124

[22] Filed: Oct. 12, 1976

[51] Int. Cl.² .............................................. B60R 9/12
[52] U.S. Cl. .......................... 280/11.37 K; 211/60 SK; 224/42.1 B; 269/43
[58] Field of Search ................. 280/11.37 K, 11.37 A; 211/60 SK; 224/45 S, 42.1 E, 42.1 B, 42.1 G, 42.1 R, 42.1 F, 29 R, 42.45 R; 269/40, 43, 88, 97

[56] References Cited

U.S. PATENT DOCUMENTS

| 2,988,253 | 6/1961 | Menghi | 224/42.1 F |
|---|---|---|---|
| 3,208,173 | 9/1965 | Shank | 224/42.1 E |
| 3,701,436 | 10/1972 | Adams | 280/11.37 K |
| 3,719,008 | 3/1973 | Mayers | 269/40 |
| 3,826,482 | 7/1974 | Tourangeau | 269/88 |
| 3,848,785 | 11/1974 | Bott | 211/60 SK |
| 3,854,712 | 12/1974 | McGee | 269/152 |
| 3,861,664 | 1/1975 | Durkee | 269/43 |

FOREIGN PATENT DOCUMENTS

| 1,066,960 | 6/1954 | France | 280/11.37 K |
|---|---|---|---|
| 2,423,565 | 11/1975 | Germany | 224/42.1 G |
| 556,983 | 2/1957 | Italy | 224/42.1 B |
| 316,062 | 10/1956 | Switzerland | 224/42.1 B |

*Primary Examiner*—Joseph F. Peters, Jr.
*Assistant Examiner*—David M. Mitchell

[57] ABSTRACT

In combination, a pair of skis and a support for the skis. The support may be used, optionally, as a car top ski carrier or a holding and clamping device to hold the skis while they are sharpened, repaired or waxed. The support includes a pair of spaced support segments, each of which includes an upstanding portion of a common height, which is less than the minimum width of the skis, so that a) the skis can be clamped to the support with their side edges in a common horizontal plane and hence, are adapted to be sharpened by manipulation of a tool or, optionally, b) the skis may be positioned in spanning relation of the upstanding portions to expose the bottom surface to be waxed, repaired, or flat filed. Additionally, a pair of clamps are provided to hold the skis to the supports; and the clamps have a loop through which a strap extends with the opposite ends of the strap being adapted by hooks for hooked-up engagement with the gutter of an automobile roof so that the support with the skis clamped to it may be used as a ski rack for transporting skis. Also, the straps may be adjustable in length.

6 Claims, 7 Drawing Figures

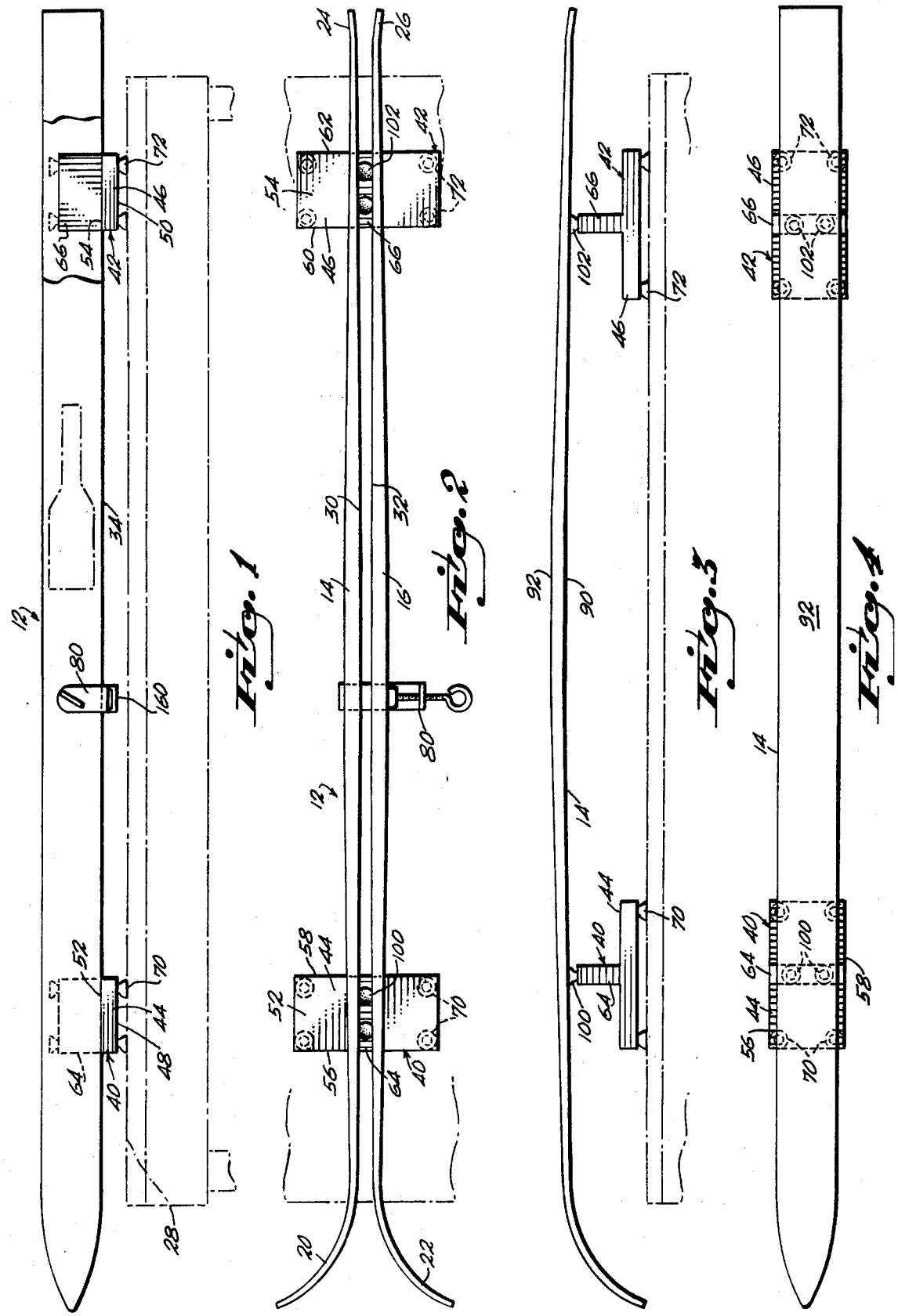

CLAMP MEANS AND SUPPORT FOR SKIS, IN COMBINATION

FIELD OF THE INVENTION

This invention relates to a ski clamping and transporting device.

Background of the Invention

As is perhaps well known skis commonly include steel edges and these edges, preferably, are dressed and honed to maintain their gripping power, especially on icy slopes. In the past, there have been numerous types of devices for holding the skis so that they can be worked upon by a sharpening device and, preferably, both skis are simultaneously sharpened to a constant 90° angle. In addition to sharpening skis, many people often repair and wax the bottom surfaces of their skis; this requires that the same be held stationary on a support surface. However, this is relatively inconvenient in many instances. Generally speaking, it has been a problem to provide a suitable device for holding skis conveniently so that they can be sharpened, repaired and waxed. For example, skiers traveling to a ski resort do not have facilities except in the room in which they temporarily reside. Therefore, there is a need for a portable stand or support for holding the skis so that they can be sharpened, repaired and/or waxed, which can be set up in a lodge or hotel room so that the same can in fact be utilized on skiing trips.

Prior Work in Field

In the past, there have been numerous types of devices for use by skiers, including the portable ski work bench of U.S. Pat. No. 3,826,482. The structure of that patent is relatively complex, and it cannot be used as an automobile ski rack. The instant invention is of a relatively simple structure which may optionally be used as a vehicle ski rack. Further, the instant invention provides for accurate edge filing of the right angle ski edges which are usually of metal. A ski clamping device of the prior art is U.S. Pat. No. 3,861,664 which also cannot be used as an automobile ski rack; and, indeed, it is screw-fastened to a support surface. A ski vice is shown in U.S. Pat. No. 3,854,712; however, this is not accurate for 90° edge filing of the steel edges of skis; it calls for a protruding lip or extension to clamp to a base table or bench on which it is supported, and thus, this limits the places where it can be used conveniently; and, finally, it cannot be used as an automobile ski rack. U.S. Pat. No. 3,719,008 does not adjust for a different length of skis. Such adjustment is important so that the skis of a couple, for example the skis of a tall male and the skis of a short female, can be conveniently sharpened by the same equipment. Additionally, U.S. Pat. No. 3,719,008 cannot be used as an automobile ski rack. Additionally, U.S. Pat. No. 3,921,976 is a device which is very complex and, notwithstanding, the same cannot be used as an automobile ski rack for the transporting of the skis.

Objects of the Present Invention

It is an object of the present invention to provide a highly portable ski holding and clamping device for use in sharpening, waxing or repairing skis and which can be utilized as a ski carrier on an automobile.

In accordance with this general object and further objects which will become apparent in view of the instant description and reference to the drawings, the instant invention will now be described.

DESCRIPTION OF THE DRAWINGS

FIG. 1 is a side elevation view of a pair of skis clamped together and supported by the instant invention;

FIG. 2 is a plan view of FIG. 1;

FIG. 3 is a side elevation view of the instant invention being used in a different manner;

FIG. 4 is a plan view of FIG. 3;

DESCRIPTION OF PREFERRED EMBODIMENT

Figure 5:
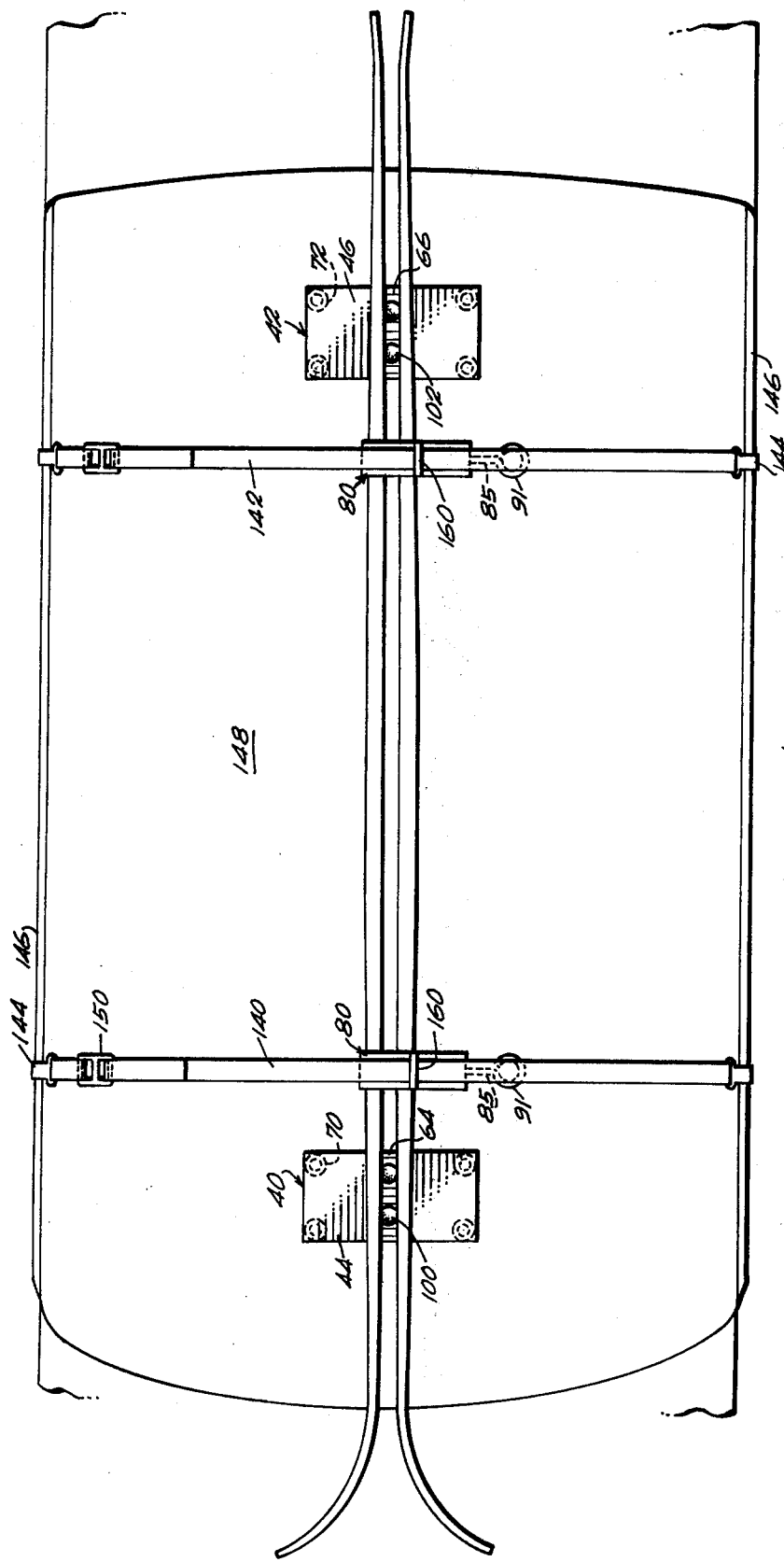
FIG. 5 is a plan view of an automobile with skis attached to it utilizing the instant invention.

Referring to the drawings wherein like reference characters designate like or corresponding parts throughout the several views, there is illustrated a pair of skis generally designated by the numeral 12; the individual skis are designated by the numerals 14 and 16 respectively. Each of the skis has a leading end 20 and 22 and a trailing edge 24 and 26. As shown, the skis are supported edgewise on supports wich rest on a support surface. The support surface forms no part of the invention and hence is indicated by the chain dot line 28. The skis are supported thusly for the purpose of sharpening the uppwardly facing side edges 30 and 32 and, later, the lower surfaces such as 34. In otder to do this, the skis are supported on their respective lower side edge, such as 34, with those edges resting on supports generally designated by the numerals 40 and 42. Each support includes a base 44 and 46. Each base has a lower surface, 48 and 50, and an upper surface, 52 and 54, which has a planar central zone at least and preferably is a flat upper surface. The central zone is spanned, between the edges, such as 56 and 58 and 60 and 62, by an upstanding portion 64 and 66. The upstanding portion has generally parallel side walls of a common height above the upper surface of the base. Extending downwardly from each base are support means, preferably in the form of suction cup means 70 and 72 which engage the surface 28. Because the height of the upstanding portion is less than the width of the skis, the upper surface, such as 30 and 32, that is the upwardly facing side faces in FIG. 2, 30 and 32 of the skis, are parallel to one another and of a same height, since the upper surface of the base is planar and the bases are of a common height. A person working on the skis, clamps them together by the clamp means 80 in the position shown on the supports to be stroked by a tool for sharpening the edges.

FIGS. 3 and 4 show a further use of the device wherein the upper surface 90 of the ski is turned downwardly so that the lower surface 92 of the ski is exposed. It is then positioned on the supports which are turned so that the upstanding portions extend laterally across the upper surface of the ski. Suction cup means 100 and 102 are provided on the upstanding portions of each base. In this manner, the undersurface 92 of the ski may be waxed or repaired readily.

Figure 7:
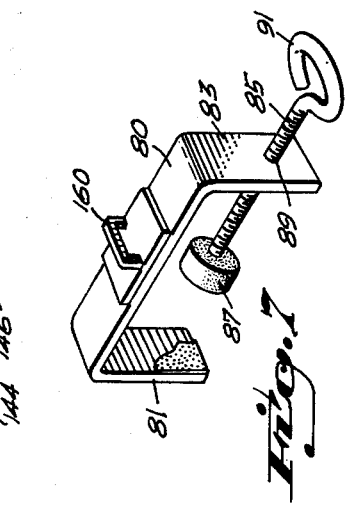
FIG. 7 is a perspective view of a clamp for clamping the skis together as shown in central zone of FIG. 2.
Figure 6:
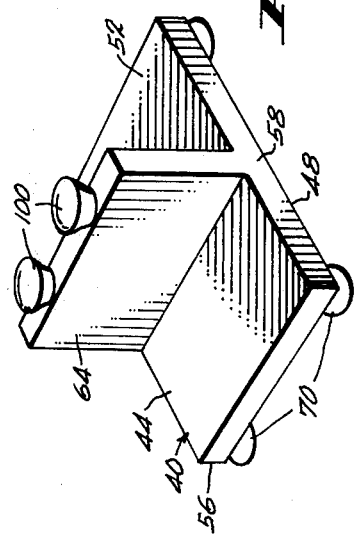
FIG. 6 is a perspective view of the support shown for the skis shown at the left and right of FIGS. 1 through 4.

Referring to FIG. 5, it is seen that the device may be utilized for transporting skis on the top of an automobile. In the embodiment shown, means are provided to connect straps 140 and 142 to hold the skis to the automobile, with each strap having hook means such as 144 which engage the gutter 146 which is conventional of the roof of an automobile, the roof being generally designated by the numeral 148. Adjustment means 150 are preferably provided for the straps 140 and 142. The preferred means for connecting the straps to the skis are shown in FIG. 7. Each of the clamping devices include a loop 160 on the exterior surface of the base of the clamp so that, when the clamp is positioned as shown in FIG. 5, the strap is adapted to be passed through the loop with the hook ends being connected to the gutter and with the strap passing through the loop.

Referring to FIG. 7, the clamp may be a conventional C-clamp wherein the legs 81 and 83 are adapted to be spanned by a movable thread member 85 having a padded terminal end 87 and which is adapted for threaded advancement or withdrawal in a threaded hole 89 in one of the legs by manipulation of an enlarged end 91.

It is thus seen that there has been provided a relatively simple structure which is adapted to serve the dual function of use as a car top ski carrier and, additionally, the function of supporting skis, either on the edges for sharpening or on the top surfaces with the lower ski surface exposed for repairing them or waxing them. Additionally, the device is highly portable and may be utilized as a ski rack by skiers who travel by automobile and do not have extensive facilities at their ski destination, such as a workshop, but who can nevertheless, repair their skis or wax them in a hotel room or lodge because of the characteristics of the device described above. Also, the device may be conveniently carried in a suitcase on an airplane to a ski destination or, indeed, stored in a compact manner when not in use, for example, in a closet.

While the instant invention has been shown and described in what is considered to be a preferred embodiment, it is recognized that departures may be made therefrom within the scope of the claims set forth hereinafter; and, therefore, the invention is not to be limited except as set forth in the claims herein.

It will be apparent that, while a single upstanding portion and set of clamps are utilized and illustrated in the preferred embodiment for treating a single pair of skis, by having two spaced upstanding portions and providing additional clamps, a first and a second pair of skis may be transported on the top of a vehicle, and, the latter embodiment is intended to be within the scope of the claims set forth herein.

What is claimed is:

1. In combination:
   A. a pair of skis, and
   B. a support means for the skis for use as a car top ski carrier and as a work holder for holding the skis during a sharpening operation and during bottom repair of the same, comprising:

said pair of skis including, a first ski and a second ski, each ski having a congruent bottom with opposite longitudinally extending edge zones and said edge zones comprising metallic bottom edges, said support means comprising a first and a second support, each including a rigid support base with a top surface having a planar zone and each support base having a bottom surface including downwardly extending friction means to engage a support surface, and each of said first in means being of an overall height sized to locate the planar zone of the top surface at a predetermined common height above said support surface, each of said supports including an upstanding portion extending medially of the planar zone and each upstanding portion having a top surface and including a first and a second vertical main side surface parallel to one another and at right angles to the planar zone and of an overall height which is less than the minimum distance between the longitudinally extending edges of the skis when the skis are in confronting relation with their respective bottom surfaces being mirror images of one another, friction means on the top surface of each of said upstanding portions to engage a ski during bottom repair of same, and U-shaped clamp means for clamping said upstanding portion between each of said pair of skis, each of said clamp means including a first leg and a second leg in spaced relation to one another joined by a base zone; said base zones of said clamp means each including an inside surface and an outside surface, and the outside surface includes a loop portion defining a pass through opening and strap means are included extending through the opening and having outwardly extending ends and hook means on the outwardly extending ends adopted to engage a gutter about the roof of an automobile.

2. The device as set forth in claim 1 wherein adjustment means are provided to adjust the strap lengths.

3. The device as set forth in claim 1 wherein said clamp means includes adjustment means for varying the clamping pressure.

4. The device as set forth in claim 2 wherein said clamp means includes adjustment means for varying the clamping pressure.

5. The device as set forth in claim 1 wherein said friction means to engage a support surface comprises suction cup means and means to secure the suction cup means to the support base of said support means.

6. The device as set forth in claim 1 wherein said friction means on the top surface comprise upwardly opening suction cups and means to connect the suction cups to the said supports.

* * * * *